(12) United States Patent
Watanabe

(10) Patent No.: US 11,323,429 B2
(45) Date of Patent: May 3, 2022

(54) ADMINISTRATION SERVER, NON-TRANSITORY COMPUTER-READABLE MEDIUM STORING COMPUTER-READABLE INSTRUCTIONS FOR ADMINISTRATION SERVER AND METHOD EXECUTED BY ADMINISTRATION SERVER

(71) Applicant: BROTHER KOGYO KABUSHIKI KAISHA, Nagoya (JP)

(72) Inventor: Satoshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 224 days.

(21) Appl. No.: 16/828,473

(22) Filed: Mar. 24, 2020

(65) Prior Publication Data
US 2020/0314084 A1    Oct. 1, 2020

(30) Foreign Application Priority Data

Mar. 27, 2019    (JP) .............................. JP2019-061410

(51) Int. Cl.
*H04L 29/06*    (2006.01)
*H04L 9/32*    (2006.01)
(Continued)

(52) U.S. Cl.
CPC ........ *H04L 63/0807* (2013.01); *G06F 21/608* (2013.01); *G06F 21/6209* (2013.01); *H04L 9/3213* (2013.01); *H04L 63/101* (2013.01)

(58) Field of Classification Search
CPC .............. H04L 63/0807; H04L 9/3213; H04L 63/101; G06F 21/608; G06F 21/6209
See application file for complete search history.

(56) References Cited

U.S. PATENT DOCUMENTS 6,141,507 A    10/2000  Sawada
9,465,837 B1*  10/2016  Ross ..................... G06F 16/245
(Continued)

FOREIGN PATENT DOCUMENTS

JP    2007-293877 A    11/2007
JP    2012-113696 A     6/2012
(Continued)

*Primary Examiner* — Catherine Thiaw
(74) *Attorney, Agent, or Firm* — Scully, Scott, Murphy & Presser, PC

(57) ABSTRACT

An administration server may receive a first signal from a communication device, the first signal including device identification information, first-type information and second-type information, in a case where the first signal is received, execute a provision process for providing a service, receive a second signal from the communication device after the first signal has been received, wherein the second signal includes the device identification information and the second-type information but does not include the first-type information, in a case where the second signal is received, execute a first notification process, receive a third signal from the communication device after the first signal has been received, wherein the third signal includes the device identification information and includes neither the first-type information nor the second-type information and in a case where the third signal is received, execute a second notification process.

20 Claims, 7 Drawing Sheets

(51) Int. Cl.
*G06F 21/60* (2013.01)
*G06F 21/62* (2013.01)

(56) References Cited

U.S. PATENT DOCUMENTS

| | | | | |
|---|---|---|---|---|
| 2007/0273923 | A1* | 11/2007 | Kimura | G06F 3/122 |
| | | | | 358/1.15 |
| 2012/0117629 | A1 | 5/2012 | Miyazawa et al. | |
| 2012/0198534 | A1* | 8/2012 | Ohta | G06F 21/608 |
| | | | | 726/8 |
| 2014/0280512 | A1* | 9/2014 | Mori | H04L 67/42 |
| | | | | 709/203 |
| 2018/0183781 | A1 | 6/2018 | Miyazawa et al. | |
| 2019/0095598 | A1* | 3/2019 | Kobayashi | G06F 21/31 |

FOREIGN PATENT DOCUMENTS

| | | |
|---|---|---|
| JP | 2013-084186 A | 5/2013 |
| JP | 2014-178985 A | 9/2014 |

* cited by examiner

ADMINISTRATION SERVER, NON-TRANSITORY COMPUTER-READABLE MEDIUM STORING COMPUTER-READABLE INSTRUCTIONS FOR ADMINISTRATION SERVER AND METHOD EXECUTED BY ADMINISTRATION SERVER

CROSS-REFERENCE TO RELATED APPLICATION

This application claims priority to Japanese Patent Application No. 2019-061410 filed on Mar. 27, 2019, the contents of which are hereby incorporated by reference into the present application.

TECHNICAL FIELD

The disclosure herein discloses art related to a server configured to provide a service related to a communication device.

TECHNICAL FIELD

A server that intermediates communication between a plurality of information devices and an information processing device is known. The server receives device state information (such as the number of pieces of print medium and a consumption level of a consumable article) from each of the plurality of information devices and sends the device state information received from the respective information devices to the information processing device. The information processing device provides a service which allows a user to see the received device state information, for example.

SUMMARY

The aforementioned technique lacks consideration of a situation in which the server becomes incapable of providing the service.

The disclosure herein provides art that notifies a user of a cause by which a provision process for providing a service related to a communication device is incapable of being executed.

An administration server disclosed herein may comprise: a processor; and a memory storing computer-readable instructions therein, wherein the computer-readable instructions, when executed by the processor, may cause the administration server to: receive a first signal from a communication device, the first signal including device identification information identifying the communication device, first-type information related to the communication device and second-type information different from the first-type information; in a case where the first signal is received, execute a provision process by using at least the first-type information included in the first signal, the provision process being a process for providing a service related to the communication device which is identified by the device identification information included in the first signal; receive a second signal from the communication device after the first signal has been received, wherein the second signal includes the device identification information and the second-type information but does not include the first-type information, and the provision process is incapable of being executed due to the first-type information not being included in the second signal; in a case where the second signal is received, execute a first notification process of notifying a user of a first cause by which the provision process is incapable of being executed; receive a third signal from the communication device after the first signal has been received, wherein the third signal includes the device identification information and includes neither the first-type information nor the second-type information, and the provision process is incapable of being executed due to the first-type information not being included in the third signal; and in a case where the third signal is received, execute a second notification process of notifying the user of a second cause by which the provision process is incapable of being executed, the second cause being different from the first cause.

A method implemented by the administration server, a computer program for the administration server and a non-transitory computer-readable medium storing computer-readable instructions for the administration server are also novel and useful. Moreover, a communication system comprising the above administration server and other device(s) (e.g., a communication device) is also novel and useful.

BRIEF DESCRIPTION OF THE DRAWINGS

EMBODIMENTS (Configuration of Communication System 2; FIG. 1)
As shown in FIG. 1, a communication system 2 is provided with an administration server 10, a printer 100, a terminal device 200, and a service provision server 900. The printer 100 and the terminal device 200 are connected to a Local Area Network (LAN) 4. The LAN 4 is connected to the Internet 6. The LAN 4 may be a wired LAN or a wireless LAN. The administration server 10 is communicable with each of the devices 100, 200 through the Internet 6. The service provision server 900 is communicable with the administration server 10 through the Internet 6. The terminal device 200 is a terminal such as a desktop PC, a tablet PC, or a smartphone. Further, hereinbelow, the service provision server will be denoted as "SP server".

Figure 1:
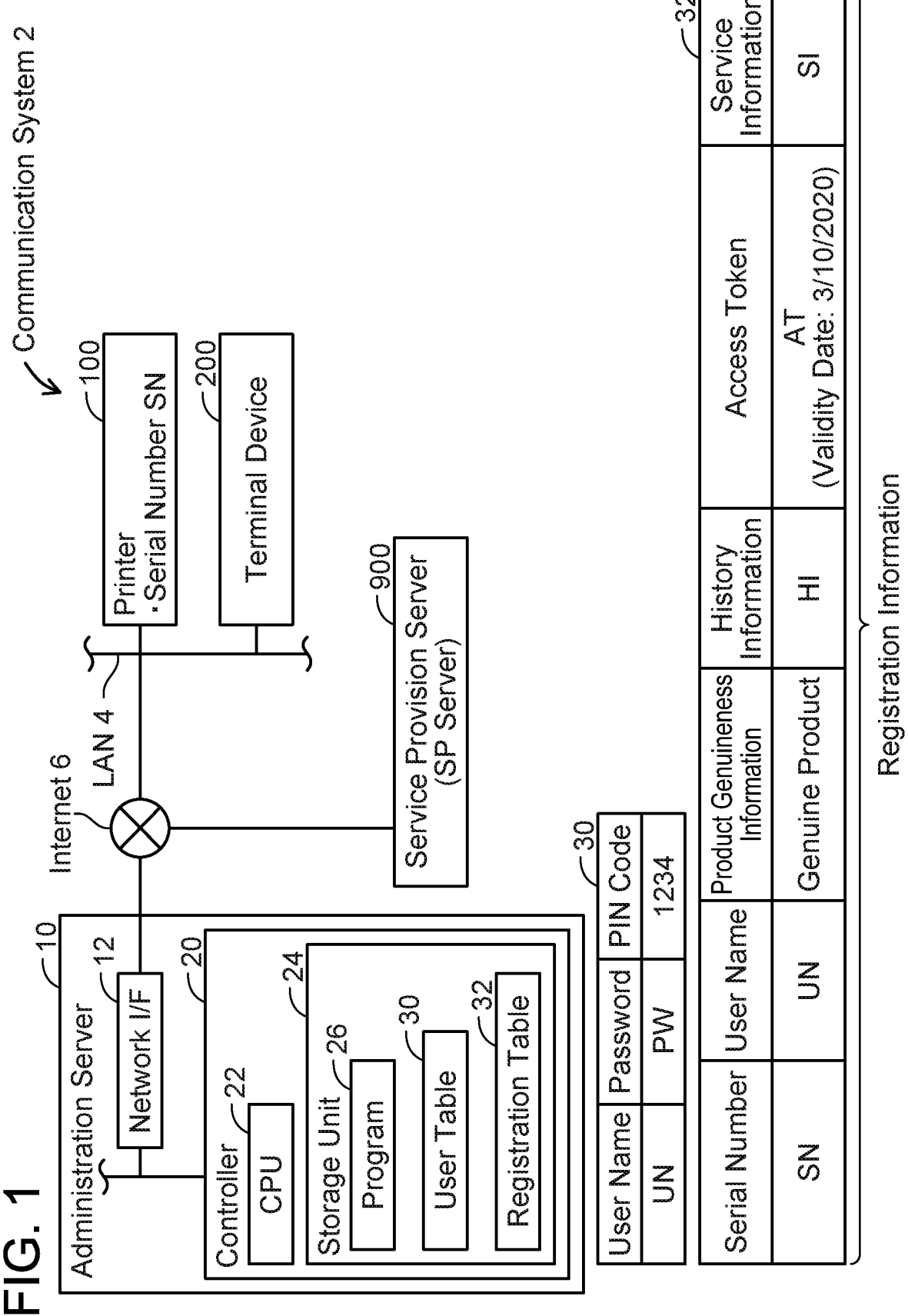
FIG. 1 shows a configuration of a communication system.

(Configuration of Printer 100)
The printer 100 is a peripheral device (such as a peripheral device of the terminal device 200) with an inkjet print function. The printer 100 stores a serial number SN for identifying the printer 100. In a variant, the printer 100 may be a peripheral device with a laser print function.

(Configuration of Administration Server 10)
The administration server 10 is a server configured to manage the printer 100 and intermediate communication between the printer 100 and the SP server 900. The administration server 10 is installed on the Internet 6 by a vendor of the printer 100. In a variant, the administration server 10 may be installed on the Internet 6 by a business entity different from the vendor.

The administration server 10 is provided with a network interface 12 and a controller 20. The respective units 12, 20 are connected to a bus line (reference sign omitted). Hereinbelow, an interface will be denoted as "I/F". The network I/F 12 is an interface configured to execute communication through the Internet 6 and is connected to the Internet 6. The controller 20 is provided with a CPU 22 and a storage unit 24. The CPU 22 is configured to execute various processes according to a program 26 stored in the storage unit 24. The storage unit 24 is constituted of a volatile memory, a nonvolatile memory, an HD drive and the like. Aside from the aforementioned program 26, the storage unit 24 stores a user table 30 and a registration table 32. In a variant, the respective tables 30, 32 may be stored in an external storage unit communicably connected to the administration server 10.

The user table 30 has one or more user information registered (that is, stored) therein. Each of the user information includes a user name (such as UN) and a password (such as PW) for identifying a user. Further, the user table 30 may store a Personal Identification Number (PIN) code (such as "1234") in association with each of the user information.

The registration table 32 has one or more registration information registered therein. Each of the registration information includes a serial number (such as SN), a user name (such as UN), product genuineness information, history information (such as HI), an access token (such as AT), and service information (such as SI). The product genuineness information indicates one of a value "genuine product" which indicates that an ink cartridge that is presently used in a printer is a genuine product, and a value "non-genuine product" which indicates that the ink cartridge that is presently used in the printer is not a genuine product. The history information is a history of information related to a printer (such as information related to the number of sheets the printer has printed (this number will be termed print number, hereinbelow)). The access token is authentication information used in communication between a printer (such as 100) and the administration server 10. A validity date is set to the access token. The service information is information that indicates a content of communication between a SP server (such as 900) and the administration server 10.

(Configuration of SP Server 900)

The SP server 900 is a server configured to provide a service related to a printer (such as 100) to a user of this printer. The SP server 900 provides the user with a shipping service of ink cartridge to be described later, for example. In a variant, the SP server 900 may be a server configured to provide the user with other services (such as a service of lending out a printer and allowing the user to print up to the allowed number of sheets) than the shipping service. Further, the SP server 900 is installed on the Internet 6 by a business entity different from the vendor of the printer 100. In a variant, the SP server 900 may be installed on the Internet 6 by the vendor of the printer 100.

Figure 2:
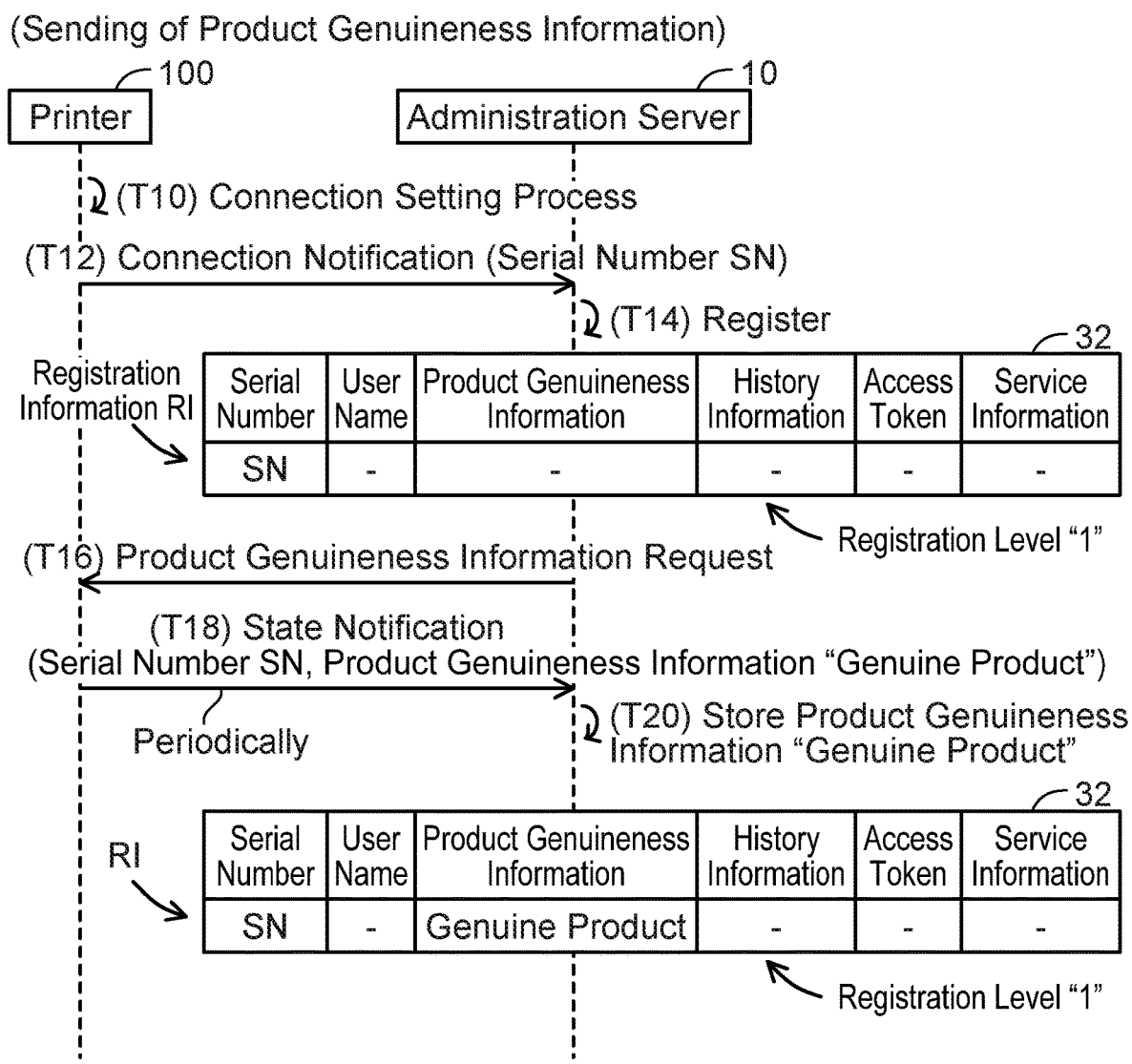
FIG. 2 shows a sequence diagram for a process of sending product genuineness information.

(Process of Sending Product Genuineness Information; FIG. 2)

A process of sending the product genuineness information will be described with reference to FIG. 2. Hereinbelow, for easier understanding, processes executed by the CPUs of the respective devices (such as the CPU 22 of the administration server 10) may be described with the respective devices (such as the administration server 10) as the subject of action, instead of describing the processes with the respective CPUs as the subject of action. Further, hereinbelow, communication is executed between the administration server 10 and the terminal device 200 as well as the printer 100 through the LAN 4 and the Internet 6. However, hereinbelow, phrases "through the LAN 4" and "through the Internet 6" will be omitted unless otherwise mentioned.

When the printer 100 accepts user's input of various types of information for connection to the Internet 6 (such as information used in communication with a router of the LAN 4), the printer 100 executes a connection setting process for connection to the Internet 6 in T10. Then, when the connection setting process is completed, the printer 100 sends a connection notification indicating that the connection setting process has been completed to the administration server 10 in T12. The connection notification includes the serial number SN of the printer 100.

When the administration server 10 receives the connection notification from the printer 100 in T12, the administration server 10 registers registration information RI including the serial number SN in the registration table 32 in T14. In the present embodiment, a registration level is defined according to how many pieces of information is included in registration information. In the present embodiment, a registration level "1" is defined for the registration information RI that does not include information other than the serial number SN and the product genuineness information. At this time, the registration information RI does not include the product genuineness information.

In T16, the administration server 10 sends a product genuineness information request to the printer 100 as a response to the connection notification. The product genuineness information request is a command for requesting the product genuineness information.

When the printer 100 receives the product genuineness information request from the administration server 10 in T16, the printer 100 sends to the administration server 10 in T18 a state notification for notifying the administration server 10 of information related to a state of the printer 100. At this point of time, the state notification includes the serial number SN and the product genuineness information in response to the product genuineness information request. For example, in a case where the printer 100 acquires predetermined information indicating a genuine product from an IC chip or the like of an ink cartridge that is presently used in the printer 100, the printer 100 sends a state notification including the product genuineness information indicating "genuine product" to the administration server 10, while in a case where the printer 100 does not acquire the predetermined information from the ink cartridge, the printer 100 sends a state notification including the product genuineness information indicating "non-genuine product" to the administration server 10. In the present case, the state notification includes the product genuineness information "genuine product". Further, the printer 100 sends the state notification periodically (such as every one hour) to the administration server 10.

When the administration server 10 receives the state notification from the printer 100 in T18, the administration server 10 stores, in the registration table 32 in T20, the product genuineness information "genuine product" in the state notification in association with the serial number SN in the state notification.

Figure 3:
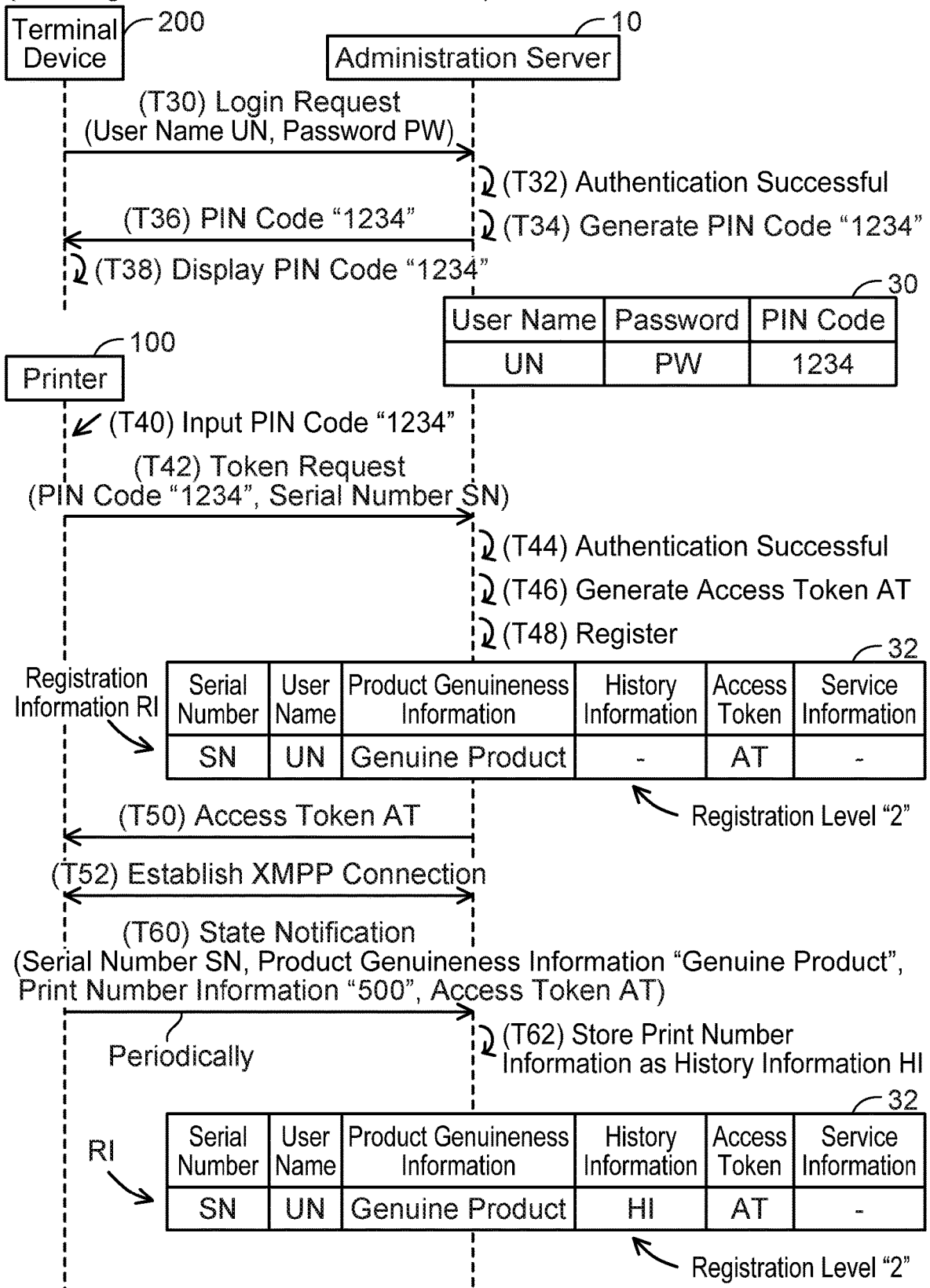
FIG. 3 shows a sequence diagram for a process of sending print number information.

(Process of Sending Print Number Information; FIG. 3)

A process of sending print number information will be described with reference to FIG. 3. FIG. 3 is a continuation of FIG. 2. In an initial state of FIG. 3, user information including the user name UN and the password PW is already registered in the user table 30 (see FIG. 1). This user information is registered in the administration server 10, for example, by a user using the terminal device 200.

When the terminal device 200 accepts an operation of designating a URL of the administration server 10 and an input operation of the user name UN and the password PW, it sends a login request including the user name UN and the password PW to the administration server 10 in T30.

When receiving the login request from the terminal device 200 in T30, the administration server 10 determines that authentication is successful in T32 since the combination of the user name UN and the password PW is already registered in the user table 30. In this case, the administration server 10 generates a PIN code "1234" and stores it in association with the logged-in user name UN in T34, and sends the PIN code "1234" to the terminal device 200 in T36.

When receiving the PIN code "1234" from the administration server 10 in T36, the terminal device 200 displays the PIN code "1234" in T38. Due to this, the user can be aware of the PIN code "1234".

When accepting a user's input of the PIN code "1234" in T40, the printer 100 sends a token request for requesting an access token to the administration server 10 in T42. The token request includes the PIN code "1234" and the serial number SN of the printer 100.

When receiving the token request from the printer 100 in T42, the administration server 10 executes authentication of the PIN code "1234" included in the token request in T44. In the present case, the administration server 10 determines that the authentication of the PIN code is successful since the PIN code "1234" included in the token request matches the PIN code "1234" in the user table 30, and specifies the user name UN stored in association with the PIN code "1234" as a registration target user name. Then, in T46, the administration server 10 generates a registration target access token AT.

In T48, the administration server 10 specifies the registration information RI which includes the serial number SN in the token request from the registration table 32. Then, the administration server 10 registers the registration target user name UN and the registration target access token AT to the registration information RI in the registration table 32. At this point of time, the registration information RI has not included history information or service information yet. History information HI is stored in the registration information RI when a state notification including print number information is received (see T62). In the present embodiment, a registration level "2" is defined for the registration information RI that does not include information other than the serial number SN, the user name UN, the product genuineness information, the history information HI, and the access token AT (that is, the registration information RI that does not include service information).

In T50, the administration server 10 sends the access token AT to the printer 100. Due to this, the printer 100 stores the access token AT in a memory (not shown) of the printer 100.

When receiving the access token AT from the administration server 10 in T50, the printer 100 uses the access token AT in T52 to establish an Extensible Messaging and Presence Protocol (XMPP) connection with the administration server 10. The XMPP connection is a so-called full-time connection and continues to be established until a power of the printer 100 is turned off. By using the XMPP connection, the administration server 10 can pass through a firewall of a LAN (such as a firewall by a router of the LAN 4) to which the printer is connected and send a request to the printer without receiving a request from the printer.

When having established the XMPP connection in T52, the printer 100 starts to periodically send, in T60, a state notification that includes the access token AT and print number information indicating a print number in the printer 100 (such as "500 sheets") in addition to the information in the state notification in T18 of FIG. 2 (that is, the product genuineness information, etc.).

When receiving the state notification from the printer 100 in T60, the administration server 10 specifies the history information HI associated with the serial number SN included in the state notification from the registration table 32 in T62, for example. Then, the administration server 10 stores the print number information included in the state notification as history information HI in the registration table 32. An administrator of the administration server 10 can be aware of the history of the print number in the printer 100 from the history information HI in the registration table 32. The administrator thereby can provide a service, such as a maintenance of the printer 100, to a user of the printer 100 by using the history of the print number of the printer 100.

Figure 4:
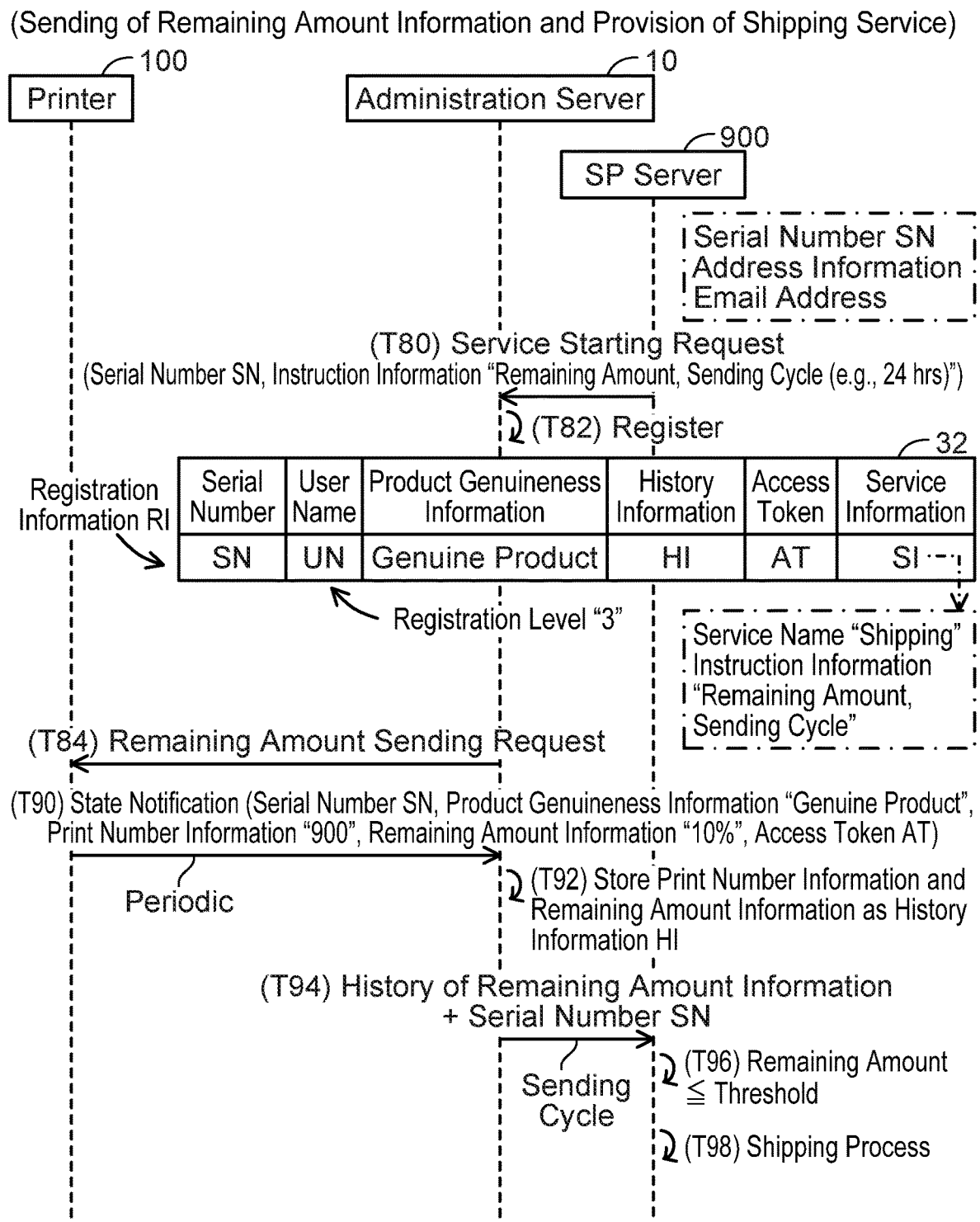
FIG. 4 shows a sequence diagram for a process of sending remaining amount information and a process of providing a shipping service.

(Process of Sending Remaining Amount Information and Process of Providing Shipping Service; FIG. 4)

A process of notifying remaining amount information and a process of providing a shipping service will be described with reference to FIG. 4. FIG. 4 is a continuation of FIG. 3.

In the present case, the user of the printer 100 receives provision of a shipping service of an ink cartridge from the SP server 900. In the present case, the SP server 900 stores a combination of the serial number SN of the printer 100, address information indicating an address where the printer 100 is installed, and an email address of the user of the printer 100. This combination is stored in the SP server 900 by the user using the terminal device 200, for example. When the above combination is stored, the SP server 900 sends a service start request for requesting start of the shipping service to the administration server 10 in T80. The service start request includes the serial number SN and instruction information indicating instructions necessary for the shipping service. As the instructions necessary for the shipping service, the instruction information includes a remaining amount of ink in the ink cartridge that is presently used in the printer 100 and a sending cycle that indicates a cycle by which the administration server 10 sends remaining amount information indicating the remaining amount.

When receiving the service start request from the SP server 900 in T80, the administration server 10 uses the serial number SN included in the service start request in T82 to specify the registration information RI from the registration table 32. Then, the administration server 10 stores a service name "shipping" of the shipping service provided by the SP server 900 and the instruction information included in the service start request as service information SI of the registration information RI in the registration table 32. In the present embodiment, a registration level "3" is defined for the registration information RI that includes the serial number SN, the user name UN, the product genuineness information, the history information HI, the access token AT, and the service information SI.

In T84, the administration server 10 uses the XMPP connection established in T52 of FIG. 3 to send to the printer 100 a remaining amount sending request for requesting sending of the remaining amount information.

When receiving the remaining amount sending request from the administration server 10 in T84, the printer 100 starts to periodically send, in T90, a state notification that includes the remaining amount information (such as "10%") indicating the remaining amount of ink in the ink cartridge that is presently used in the printer 100 in addition to the information in the state notification of T60 (that is, the print number information, the access token AT, etc.).

When receiving the state notification from the printer 100 in T90, the administration server 10 specifies the history information HI associated with the serial number SN included in the state notification from the registration table 32 in T92. Then, the administration server 10 stores the remaining amount information included in the state notification as the history information HI in the registration table 32 as well as storing the print number information included in the state notification as the history information HI in the registration table 32.

Further, after having sent the remaining amount sending request in T84, the administration server 10 monitors elapse of the sending cycle in the service information SI. Then, when the sending cycle has elapsed, the administration server 10 sends a combination of the history of the remaining amount information in the history information HI and the serial number SN to the SP server 900 in T94.

When receiving the combination of the history of the remaining amount information and the serial number SN from the administration server 10 in T94, the SP server 900 determines in T96 whether the remaining amount indicated by the latest remaining amount information in the history of the remaining amount information is no more than a predetermined threshold (such as 10%). In the case of FIG. 4, the SP server 900 determines that the remaining amount of ink is equal to or less than the predetermined threshold in T96, and executes a process of T98. In a case of determining that the remaining amount of ink is greater than the threshold, the SP server 900 does not execute the process of T98. A condition on which whether to execute the process of T98 or not is determined may not be limited to the condition that the remaining amount of ink is equal to or less than the threshold, and may include other conditions (such as a condition that a change in the remaining amount calculated from the history of the remaining amount information is equal to or greater than a predetermined value).

In T98, the SP server 900 executes a shipping process for shipping a new cartridge to be used in the printer 100. Specifically, the SP server 900 firstly specifies the address information associated with the serial number SN received in T94. Then, the SP server 900 executes a process for shipping the new cartridge to the address indicated by the specified address information (such as notification to a working staff). Further, the SP server 900 sends an email that includes a message indicating the new cartridge will be shipped, to the email address associated with the serial number SN.

Figure 5:
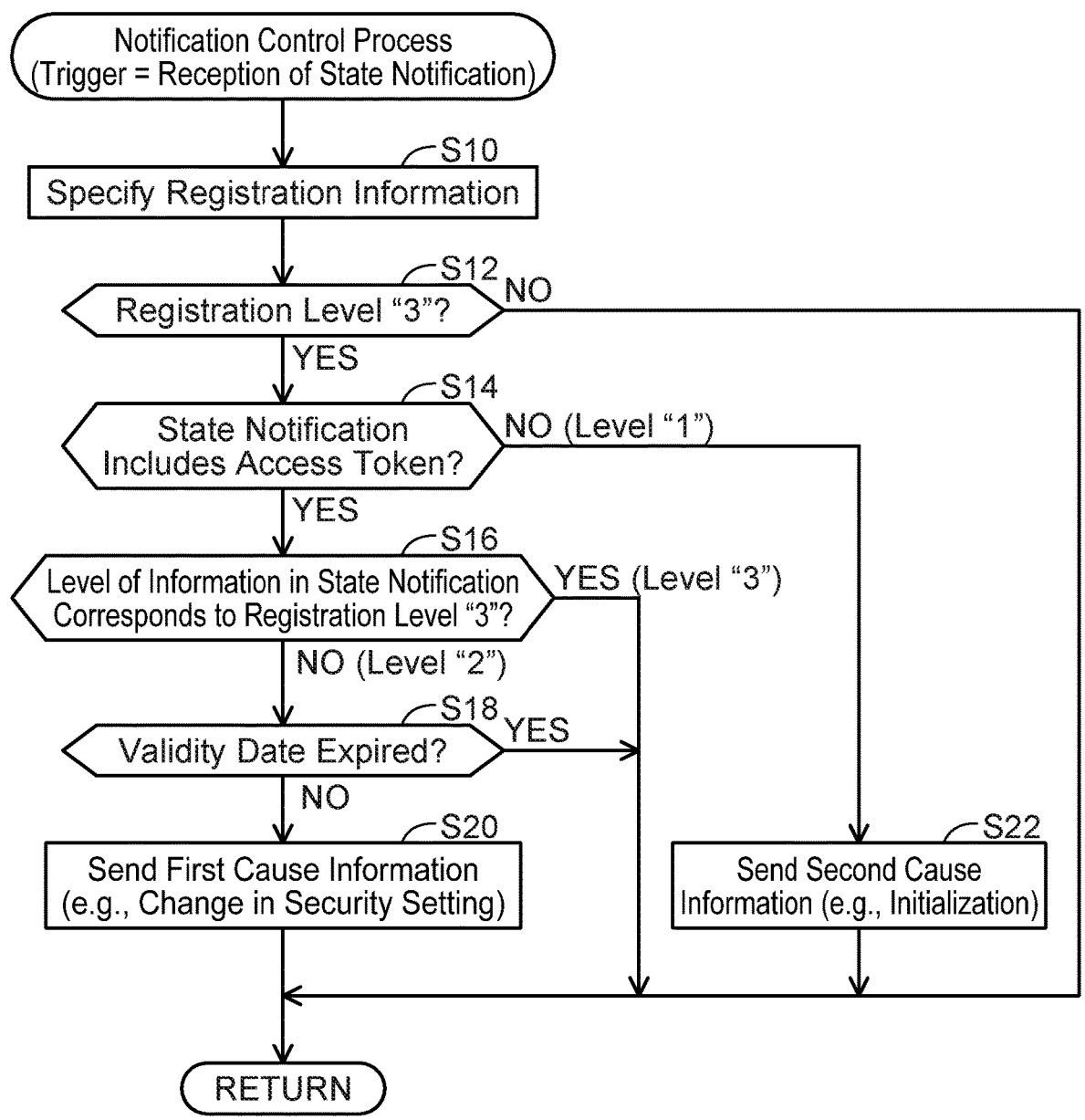
FIG. 5 shows a flowchart of a notification control process.

(Notification Control Process; FIG. 5)

A notification control process executed by the CPU 22 of the administration server 10 will be described with reference to FIG. 5. The notification control process is a process for notifying the SP server 900 of a cause by which the remaining amount information cannot be sent to the SP server 900 in a case where such a situation occurs (the cause may include deletion of the access token AT from the memory of the printer 100 due to initialization of the printer 100, for example). The notification control process is executed with reception of a state notification from the printer 100 as the trigger. As described above, when receiving a state notification from the printer 100, the administration server 10 stores the information in the state notification in the registration table 32 (see T92 of FIG. 4).

In S10, the CPU 22 specifies the registration information including the serial number in the state notification from the registration table 32.

In S12, the CPU 22 determines whether or not the registration level of the specified registration information is "3" (that is, whether the registration information includes the service information or not). The CPU 22 proceeds to S14 in a case of determining that the level of the specified registration information is "3" (YES in S12), while it returns to monitoring reception of a state notification in a case of determining that the level of the specified registration information is "1" or "2" (NO in S12).

In S14, the CPU 22 determines whether or not the state notification includes an access token. As described above, in case of the registration level "3", the state notification includes an access token (see T90 of FIG. 4). Further, also in case of the registration level "2", the state notification includes an access token (see T60 of FIG. 3). The state notification not including an access token means that a level of the information in the state notification (that is, the number of pieces of information therein) does not correspond to the registration level "2" nor "3". In a case of determining that the state notification includes an access token (YES in S14), the CPU 22 determines that the level of the information in the state notification (that is, the number of pieces of information therein) corresponds to either the registration level "2" or "3", and proceeds to S16.

In S16, the CPU 22 determines whether or not the level of the information in the state notification corresponds to the registration level "3". Specifically, the CPU 22 determines that the level of the information in the state notification corresponds to the registration level "3" (YES in S16) in a case where the state notification includes the remaining amount information, skips S18 and S20 which will be described later, and returns to monitoring reception of a state notification. On the other hand, in a case where the state notification does not include the remaining amount information, the CPU 22 determines that the level of the information in the state notification corresponds to the registration level "2" (NO in S16) and proceeds to S18.

In S18, the CPU 22 determines whether or not the validity date of the access token associated with the serial number in the state notification has expired. The CPU 22 proceeds to S20 in a case of determining that the validity date of the access token has not expired (NO in S18), while it skips the process of S20 and returns to monitoring reception of a state notification in a case of determining that the validity date of the access token has expired (YES in S18).

In S20, the CPU 22 sends, to the SP server 900, first cause information that indicates a first cause by which the remaining amount information cannot be sent. In the situation where the process of S20 is executed, the level of the information in the state notification corresponds to the registration level "2", despite the registration level being "3". That is, the state notification includes the access token but does not include the remaining amount information. In this case, the first cause would be that the user has changed a security setting, which is for sending of detailed information of the printer 100 including the remaining amount information to external, from "allowed" to "not allowed", for example. The SP server 900 can be aware of the first cause by the first cause information having been sent to the SP server 900. Further, the first cause information includes the serial number in the state notification. When the first cause information is sent to the SP server 900, the SP server 900 sends an email that includes a message indicating the first cause to the email address associated with the serial number in the first cause information. Due to this, the user can be notified of the first cause. When S20 is completed, the CPU 22 returns to monitoring reception of a state notification.

In a case of determining that the state notification does not include an access token (NO in S14), the CPU 22 determines that the level of the information in the state notification (that is, the number of pieces of information therein) corresponds to the registration level "1" and proceeds to S22. In S22, the CPU 22 sends, to the SP server 900, second cause information indicating a second cause by which the remaining amount information cannot be sent. In the situation where the process of S22 is executed, the level of the information in the state notification corresponds to the registration level "1", despite the registration level being "3". That is, the state notification does not include an access token or remaining amount information. In this case, the second cause would be that the access token has been deleted from the memory of the printer 100 due to initialization of the printer 100 by the user, for example. The SP server 900 can be aware of the second cause by the second cause information having been sent to the SP server 900. When the second cause information is sent to the SP server 900, the SP server 900 sends an email that includes a message indicating the second cause. Due to this, the user can be notified of the second cause. When S22 is completed, the CPU 22 returns to monitoring reception of a state notification.

Figure 6:
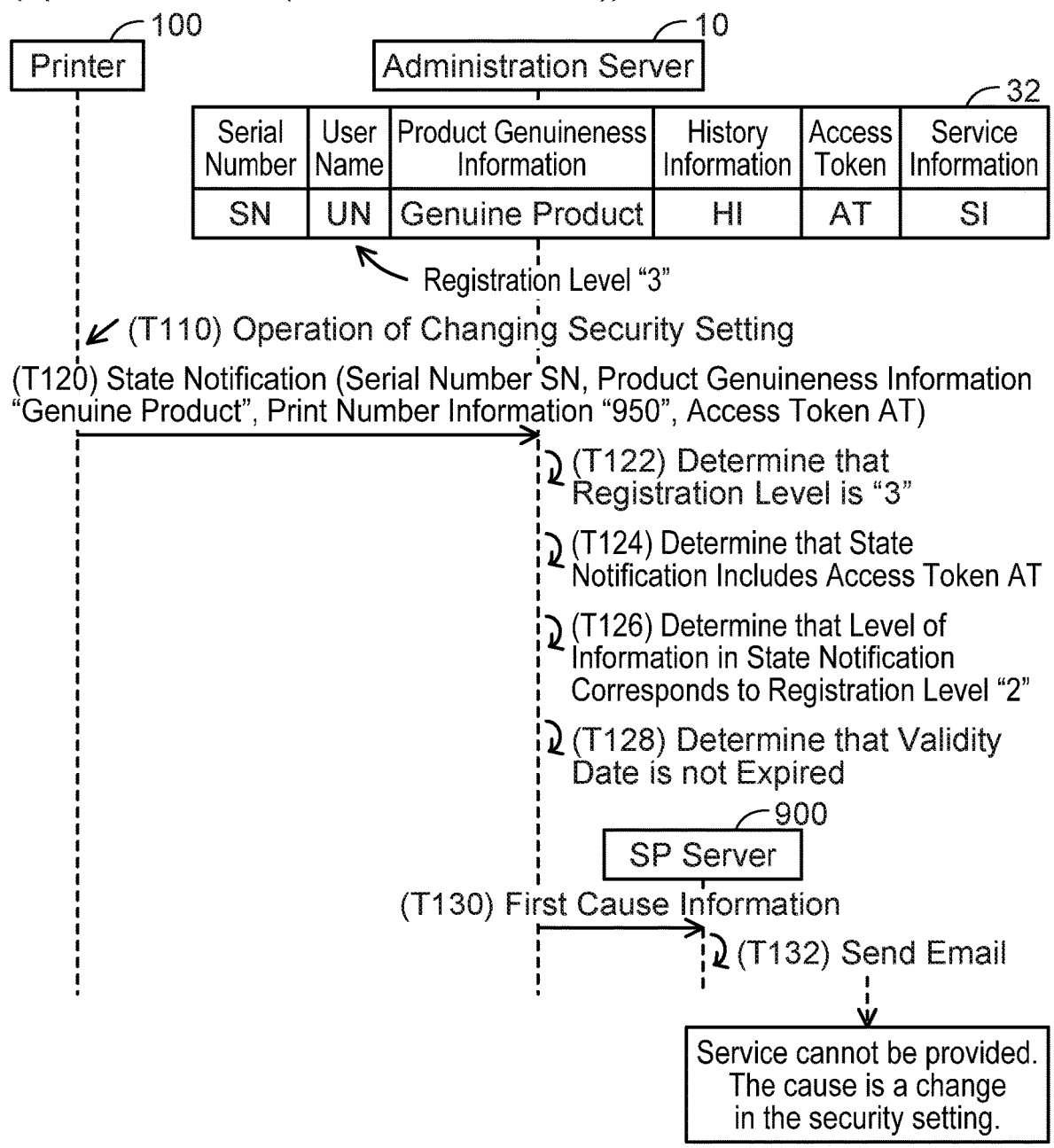
FIG. 6 shows a specific case C1 realized by the notification control process.

(Specific Case C1; FIG. 6)

Specific Case C1 realized by the notification control process of FIG. 5 will be described with reference to FIG. 6. FIG. 6 is a continuation of FIG. 4. That is, in an initial state of FIG. 6, the registration level of the registration information RI is "3".

When accepting an operation of changing the security setting from the user in T110, the printer 100 changes the security setting of the printer 100 from "allowed" to "not allowed". Due to this, the printer 100 becomes incapable of sending the remaining amount information to external (such as, to the administration server 10).

In T120, the printer 100 sends to the administration server 10 a state notification that includes the serial number SN, the product genuineness information "genuine product", the print number information "950 sheets", and the access token AT but does not include the remaining amount information.

When receiving the state notification from the printer 100 in T120, the administration server 10 specifies the registration information RI including the serial number SN from the registration table 32 in T122 (S10 of FIG. 5). Then, the administration server 10 determines that the registration level of the registration information RI is "3" (YES in S12).

In T124, the administration server 10 determines that the state notification includes the access token AT (YES in S14 of FIG. 5). In T126, the administration server 10 determines that the level of the information in the state notification corresponds to the registration level "2" (NO in S16) since the state notification does not include the remaining amount information. In the present case, the validity date of the access token AT in the registration information RI has not expired. Therefore, the administration server 10 determines in T128 that the validity date of the access token AT has not expired (NO in S18). Then, in T130, the administration server 10 sends the first cause information indicating the first cause (that is, the change in the security setting) to the SP server 900 (S20).

When receiving the first cause information from the administration server 10 in T130, the SP server 900 sends an email that includes a message indicating the change in the security setting to the email address associated with the serial number SN included in the first cause information in T132. Due to this, the user can be aware that the remaining amount information was not sent to the SP server 900 due to the change in security setting and the shipping service cannot be provided. In this case, the user operates the printer 100 to change the security setting of the printer 100 from "not allowed" to "allowed". As a result, provision of the shipping service is restarted.

Figure 7:
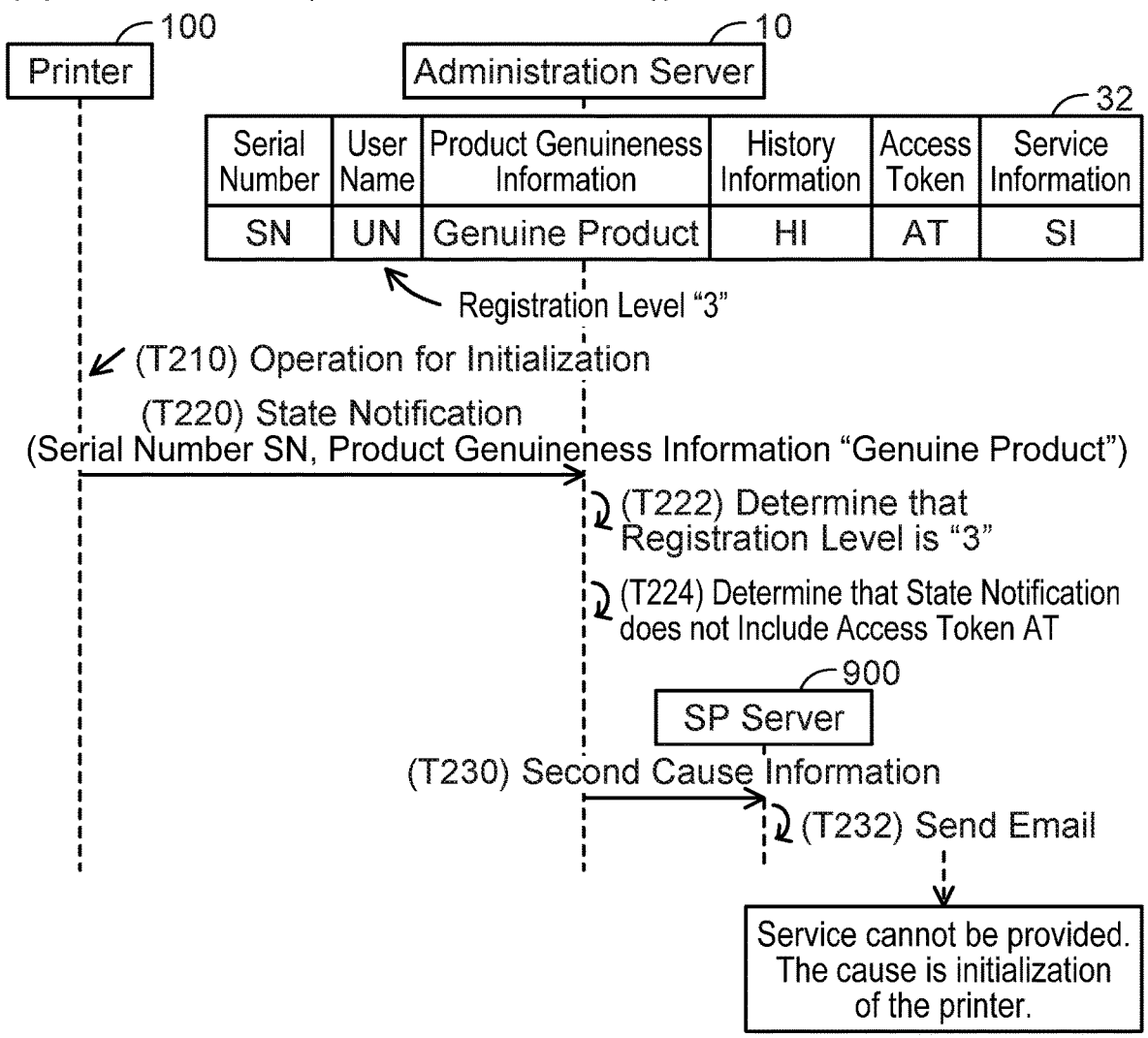
FIG. 7 shows a specific case C2 realized by the notification control process.

(Specific Case C2; FIG. 7)

Specific Case C2 realized by the notification control process of FIG. 5 will be described with reference to FIG. 7. FIG. 7 is a continuation of FIG. 4. That is, in an initial state of FIG. 7, the registration level of the registration information RI is "3".

When accepting a predetermined operation from the user in 1210, the printer 100 executes an initialization process for initializing the printer 100. In the initialization process, the respective information stored in the printer 100 (such as its setting information and the access token AT) are deleted.

In T220, the printer 100 sends to the administration server 10 a state notification that includes the serial number SN and the product genuineness information "genuine product" but does not include the print number information, the remaining amount information, or the access token AT.

T222 is the same as T122 of FIG. 6. In T224, the administration server 10 determines that the state notification does not include the access token AT (NO in S14 of FIG. 5). That is, the administration server 10 determines that the level of the information in the state notification corresponds to the registration level "1". In this case, the administration server 10 sends the second cause information indicating the second cause (that is, the initialization) to the SP server 900 in T230 (S22).

When receiving the second cause information from the administration server 10 in T230, the SP server 900 sends an email that includes a message indicating the initialization to the email address associated with the serial number SN included in the second cause information in T232. Due to this, the user can aware that the remaining amount information was not sent to the SP server 900 due to the initialization and the shipping service cannot be provided. In this case, the user operates the printer 100 to input the PIN code, for example. Due to this, the printer 100 executes a process similar to T42 of FIG. 3 and receives an access token again from the administration server 10. As a result, provision of the shipping service is restarted.

Effects of Embodiment

According to the configuration of the present embodiment, in the case of receiving the state notification that includes the remaining amount information and the access token AT (T90 of FIG. 4), the administration server 10 sends the remaining amount information to the SP server 900 (T94). Due to this, the shipping service is provided by the SP server 900. In the case of receiving the state notification that includes the access token AT but does not include the remaining amount information (T120 of FIG. 6) after the process of T90, the administration server 10 sends to the SP server 900 the first cause information indicating the first cause (that is, the change in security setting) by which sending of the remaining amount information cannot be executed (T130). Due to this, the email including a message indicating the first cause is sent to the user by the SP server 900 (T132). On the other hand, in the case of receiving the state notification that does not include the access token AT nor the remaining amount information (T220 of FIG. 7) after the process of T90, the administration server 10 sends to the SP server 900 the second cause information indicating the second cause (that is, the initialization) by which sending of the remaining amount information cannot be executed (T230). Due to this, the email including a message indicating the second cause is sent to the user by the SP server 900 (T232). As such, the user can be notified of the cause according to the content of the information included in the received state notification. Due to this, the user can be appropriately notified of the cause why sending of the remaining amount information cannot be executed.

Further, according to the configuration of the present embodiment, the administration server 10 sends the cause information to the SP server 900 (T130 of FIG. 6 or T230 of FIG. 7). For example, a comparative example may be assumed in which the administration server 10 sends an email including a message indicating the cause to the user. In this comparative example, the administration server 10 needs to know the email address of the user. Contrary to this, according to the configuration of the present embodiment, the administration server 10 does not need to know the email address of the user. Therefore, the email address, which is private information, can be prevented from being known unnecessarily by the administration server 10. As a variant, the configuration of the above-described comparative example may be employed.

(Corresponding Relationships)

The administration server 10, the printer 100, and the SP server 900 are respectively examples of "administration server", "communication device", and "service provision server". The ink cartridge is an example of "consumable article". The serial number SN, the remaining amount information, and the access token AT are respectively examples of "device identification information", "first-type information (and information related to a remaining amount of the colorant)", and "second-type information (and authentication information)". The remaining amount sending request in T84 of FIG. 4 is an example of "sending request". The state notification in T90 of FIG. 4 is an example of "first signal". The sending of the remaining amount information in T94 is an example of "provision process". The state notification in T120 of FIG. 6 is an example of "second signal". The security setting and the change in the security setting are respectively examples of "predetermined setting" and "first cause". The state notification in T220 of FIG. 7 is an example of "third signal". The initialization is an example of "second cause".

T90 and T94 of FIG. 4 are respectively examples of "receive a first signal" and "execute a provision process". T120 and T130 of FIG. 6 are respectively examples of "receive a second signal" and "execute a first notification process". T220 and T230 of FIG. 7 are respectively examples of "receive a third signal" and "execute a second notification process".

(Variant 1) The "communication device" is not limited to the printer 100, and may for example be a scanner, a multifunction device configured to be capable of executing a print function and a scan function, or a terminal device. In a case where the communication device is a scanner, for example, the "first-type information" is scan data and the "provision process" is a process of sending the scan data to a SP server (such as Facebook (registered trademark)) which provides an image data storage area to the user.

(Variant 2) In the above embodiment, the state notification includes the remaining amount information. Instead of this, the state notification may include used amount information that indicates a used amount of the ink contained in the ink cartridge. In this variant, the used amount information is an example of "information related to a remaining amount of the colorant". Further, "colorant" is not limited to ink for inkjet scheme, and may be toner for laser scheme.

(Variant 3) According to the above embodiment, the state notification in T90 of FIG. 4 includes the serial number SN, the remaining amount information, and the access token, as well as the product genuineness information and the print number information. Instead of this, the state notification in T90 of FIG. 4 may not include the product genuineness information nor the print number information. Generally speaking, the "first signal" may include only the device identification information, the first-type information, and the second-type information. The "second signal" may include only the device identification information and the second-type information. The "third signal" may include only the device identification information. Further, the state notification in T90 of FIG. 4 may further include information (such as the number of replacements of the ink cartridge) other than the five pieces of information mentioned above. Generally speaking, the "first signal" may include information other than the device identification information, the first-type information, and the second-type information. The "second signal" may include information other than the device identification information and the second-type information. The "third signal" may include information other than the device identification information.

(Variant 4) The "first-type information" is not limited to the remaining amount information, and may for example be the print number information. In this case, the SP server 900 may be a server that lends out the printer to the user and provides a service of allowing the user to print according to the allowed number of sheets.

(Variant 5) The "second-type information" is not limited to the access token AT, and may for example be the print number information. In this case, in S14 of FIG. 5, the administration server 10 may determine whether or not the state notification includes the print number information. Then, the administration server 10 may skip S18 and S20 in a case of determining that the state notification includes the print number information, while it may proceed to S18 in a case of determining that the state notification does not include the print number information. According to this variant, the "authentication information" may be omitted. Further, generally speaking, the "second-type information" may simply be different from the first-type information.

(Variant 6) The communication system 2 may not be provided with the SP server 900. In this case, the process of T94 of FIG. 4 may not be executed, and the processes of T96 and T98 may be executed by the administration server 10. In this variant, the "service provision server" may be omitted, and the processes of T96 and T98 executed by the administration server 10 are examples of the "provision process".

(Variant 7) The "first cause" is not limited to the change in the security setting, and may for example be that the printer 100 is in a state incapable of detecting the remaining amount. Here, the state incapable of detecting the remaining amount may include a state in which an error, such as a failure in a remaining amount sensor configured to detect the remaining amount, occurs, and a state in which an ink cartridge of which remaining amount cannot be detected by the remaining amount sensor (such as a non-genuine ink cartridge) is used, for example.

(Variant 8) In the above embodiment, the administration server 10 sends the cause information to the SP server 900 (T130 of FIG. 6 or T230 of FIG. 7). Instead of this, the administration server 10 may send an email including a message indicating the cause to the user. According to this variant, sending of the email by the administration server 10 is an example of the "first notification process (and second notification process)".

(Variant 9) The process of T50 of FIG. 3 may not be executed. In this case, the printer 100 may start sending a state notification including the print number information in response to accepting an instruction for sending the print number information from the user. According to this variant, "send authentication information" may be omitted. Further, the process of T84 of FIG. 4 may not be executed. In this case, the printer 100 may start sending a state notification including the remaining amount information in response to accepting an instruction for sending the remaining amount information from the user. According to this variant, "send a sending request" may be omitted.

(Variant 10) In the above embodiment, the administration server 10 returns to monitoring reception of a state notification in the case of determining that the registration level of the registration information is "2" (NO in S12). Instead of this, the administration server 10 may determine whether or not the state notification includes an access token in the case of determining that the registration level of the registration information is "2". Then, the administration server 10 may determine that the level of the information in the state notification does not correspond to the registration level "2" in a case of determining that the state notification does not include an access token. In this case, the administration server 10 may notify the user of a cause by which the state notification does not include an access token (such as the initialization).

(Variant 11) In the above embodiment, the respective processes of FIGS. 2 to 7 are implemented by software (i.e., the program 26). Instead of this, one or more of the processes may be implemented by hardware such as a logic circuit.

What is claimed is:

1. An administration server comprising:
   a processor; and
   a memory storing computer-readable instructions therein, wherein the computer-readable instructions, when executed by the processor, cause the administration server to:
   receive a first signal from a communication device, the first signal including device identification information identifying the communication device, first-type information related to the communication device and second-type information different from the first-type information;
   in a case where the first signal is received, execute a provision process by using at least the first-type information included in the first signal, the provision process being a process for providing a service related to the communication device which is identified by the device identification information included in the first signal;
   receive a second signal from the communication device after the first signal has been received, wherein the second signal includes the device identification information and the second-type information but does not include the first-type information, and the provision process is incapable of being executed due to the first-type information not being included in the second signal;
   in a case where the second signal is received, execute a first notification process of notifying a user of a first cause by which the provision process is incapable of being executed;
   receive a third signal from the communication device after the first signal has been received, wherein the third signal includes the device identification information and includes neither the first-type information nor the second-type information, and the provision process is incapable of being executed due to the first-type information not being included in the third signal; and
   in a case where the third signal is received, execute a second notification process of notifying the user of a second cause by which the provision process is incapable of being executed, the second cause being different from the first cause.

2. The administration server as in claim 1, wherein
   the provision process includes a process of sending at least the first-type information included in the first signal to a service provision server configured to provide the service, the service provision server being different from the administration server,
   the first notification process includes a process of sending first cause information indicating the first cause to the service provision server, and
   the second notification process includes a process of sending second cause information indicating the second cause to the service provision server.

3. The administration server as in claim 1, wherein
   the computer-readable instructions, when executed by the processor, further cause the administration server to:
   before the first signal is received, send authentication information to the communication device, the authentication information being for the administration server to authenticate the communication device; and
   before the first signal is received, send a sending request to the communication device, the sending request being for requesting sending of information used for the service,
   wherein after the authentication information and the sending request have been sent to the communication device, the first signal in response to the sending request is received from the communication device.

4. The administration server as in claim 3, wherein
   in a case where an operation of changing a predetermined setting of the communication device is performed to the communication device after the authentication information and the sending request have been sent to the communication device, the second signal is received from the communication device, and
   the first cause indicates that the predetermined setting has been changed.

5. The administration server as in claim 3, wherein
   in a case where the communication device is initialized after the authentication information and the sending request have been sent to the communication device, the third signal is received from the communication device, and
   the second cause indicates that the communication device has been initialized.

6. The administration server as in claim 3, wherein
   the second-type information included in the first signal received from the communication device is the same as the authentication information which has been sent to the communication device.

7. The administration server as in claim 3, wherein
the second-type information included in the second signal received from the communication device includes an access token, and
the computer-readable instructions, when executed by the processor, further cause the administration server to:
in a case where the second signal is received and a validity date of the access token does not expire, the first notification process is executed.

8. The administration server as in claim 1, wherein
the service is a service of shipping a consumable article used in the communication device to the user.

9. The administration server as in claim 8, wherein
the communication device is a device configured to execute a print function,
the consumable article is a cartridge including a colorant used for the print function, and
the first-type information is information related to a remaining amount of the colorant.

10. A non-transitory computer-readable medium storing computer-readable instructions for an administration server, wherein the computer-readable instructions, when executed by a processor of the administration server, cause the administration server to:
receive a first signal from a communication device, the first signal including device identification information identifying the communication device, first-type information related to the communication device and second-type information different from the first-type information;
in a case where the first signal is received, execute a provision process by using at least the first-type information included in the first signal, the provision process being a process of providing a service related to the communication device which is identified by the device identification information included in the first signal;
receive a second signal from the communication device after the first signal has been received, wherein the second signal includes the device identification information and the second-type information but does not include the first-type information and the provision process is incapable of being executed due to the first-type information not being included in the second signal;
in a case where the second signal is received, execute a first notification process of notifying a user of a first cause by which the provision process is incapable of being executed;
receive a third signal from the communication device after the first signal has been received, wherein the third signal includes the device identification information and includes neither the first-type information or the second-type information and the provision process is incapable of being executed due to the first-type information being not included in the third signal; and
in a case where the third signal is received, execute a second notification process of notifying the user of a second cause by which the provision process is incapable of being executed, the second cause being different from the first cause.

11. The non-transitory computer-readable medium as in claim 10, wherein
the provision process includes a process of sending at least the first-type information included in the first signal to a service provision server configured to provide the service, the service provision server being different from the administration server,
the first notification process includes a process of sending first cause information indicating the first cause to the service provision server, and
the second notification process includes a process of sending second cause information indicating the second cause to the service provision server.

12. The non-transitory computer-readable medium as in claim 10, wherein
the computer-readable instructions, when executed by the processor, further cause the administration server to:
before the first signal is received, send authentication information to the communication device, the authentication information being for the administration server to authenticate the communication device; and
before the first signal is received, send a sending request to the communication device, the sending request being for requesting sending of information used for the service,
wherein after the authentication information and the sending request have been sent to the communication device, the first signal in response to the sending request is received from the communication device.

13. The non-transitory computer-readable medium as in claim 12, wherein
in a case where an operation of changing a predetermined setting of the communication device is performed to the communication device after the authentication information and the sending request have been sent to the communication device, the second signal is received from the communication device, and
the first cause indicates that the predetermined setting has been changed.

14. The non-transitory computer-readable medium as in claim 12, wherein
in a case where the communication device is initialized after the authentication information and the sending request have been sent to the communication device, the third signal is received from the communication device, and
the second cause indicates that the communication device has been initialized.

15. The non-transitory computer-readable medium as in claim 12, wherein
the second-type information included in the first signal received from the communication device is the same as the authentication information which has been sent to the communication device.

16. The administration server as in claim 12, wherein
the second-type information included in the second signal received from the communication device includes an access token, and
the computer-readable instructions, when executed by the processor, further cause the administration server to:
in a case where the second signal is received and a validity date of the access token does not expire, the first notification process is executed.

17. The non-transitory computer-readable medium as in claim 10, wherein
the service is a service of shipping a consumable article used in the communication device to the user.

18. The non-transitory computer-readable medium as in claim 17, wherein
the communication device is a device configured to execute a print function, the consumable article is a cartridge including a colorant used for the print function, and the first-type information is information related to a remaining amount of the colorant.

19. A method executed by an administration server, the method comprising:

receiving a first signal from a communication device, the first signal including device identification information identifying the communication device, first-type information related to the communication device and second-type information different from the first-type information;

in a case where the first signal is received, executing a provision process by using at least the first-type information included in the first signal, the provision process being a process of providing a service related to the communication device which is identified by the device identification information included in the first signal;

receiving a second signal from the communication device after the first signal has been received, wherein the second signal includes the device identification information and the second-type information but does not include the first-type information and the provision process is incapable of being executed due to the first-type information being not included in the second signal;

in a case where the second signal is received, executing a first notification process of notifying a user of a first cause by which the provision process is incapable of being executed;

receiving a third signal from the communication device after the first signal has been received, wherein the third signal includes the device identification information and includes neither the first-type information or the second-type information and the provision process is incapable of being executed due to the first-type information being not included in the third signal; and in a case where the third signal is received, executing a second notification process of notifying the user of a second cause by which the provision process is incapable of being executed, the second cause being different from the first cause.

20. The method as in claim 19, wherein the provision process includes a process of sending at least the first-type information included in the first signal to a service provision server configured to provide the service, the service provision server being different from the administration server, the first notification process includes a process of sending first cause information indicating the first cause to the service provision server, and the second notification process includes a process of sending second cause information indicating the second cause to the service provision server.

* * * * *